US010329372B2

(12) United States Patent
Otero Martinez et al.

(10) Patent No.: US 10,329,372 B2
(45) Date of Patent: Jun. 25, 2019

(54) POLYURETHANES WITH REDUCED ALDEHYDE EMISSION

(71) Applicant: BASF SE, Ludwigshafen (DE)

(72) Inventors: Iran Otero Martinez, Stemwede (DE); Peter Nesvadba, Marly (CH); Julio Albuerne, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 133 days.

(21) Appl. No.: 15/315,662

(22) PCT Filed: Jun. 5, 2015

(86) PCT No.: PCT/EP2015/062540
§ 371 (c)(1),
(2) Date: Dec. 1, 2016

(87) PCT Pub. No.: WO2015/189095
PCT Pub. Date: Dec. 17, 2015

(65) Prior Publication Data
US 2018/0186923 A1 Jul. 5, 2018

(30) Foreign Application Priority Data
Jun. 13, 2014 (EP) .................................. 14172395

(51) Int. Cl.
C08G 18/66 (2006.01)
C08G 18/62 (2006.01)
C08G 18/48 (2006.01)
C08G 18/72 (2006.01)
C08G 18/76 (2006.01)
C08G 18/79 (2006.01)
C08G 18/10 (2006.01)
C08G 18/18 (2006.01)
C08G 18/38 (2006.01)
C08G 18/50 (2006.01)
C08J 9/12 (2006.01)
C08G 101/00 (2006.01)

(52) U.S. Cl.
CPC ......... *C08G 18/6283* (2013.01); *C08G 18/10* (2013.01); *C08G 18/1825* (2013.01); *C08G 18/3819* (2013.01); *C08G 18/482* (2013.01); *C08G 18/4804* (2013.01); *C08G 18/4837* (2013.01); *C08G 18/4845* (2013.01); *C08G 18/5024* (2013.01); *C08G 18/6685* (2013.01); *C08G 18/725* (2013.01); *C08G 18/7664* (2013.01); *C08G 18/7671* (2013.01); *C08G 18/797* (2013.01); *C08J 9/125* (2013.01); C08G 2101/005 (2013.01); C08G 2101/0008 (2013.01); C08G 2101/0016 (2013.01); C08G 2101/0025 (2013.01); C08G 2101/0058 (2013.01); C08G 2101/0066 (2013.01); C08G 2101/0083 (2013.01); C08J 2203/10 (2013.01); C08J 2205/06 (2013.01); C08J 2205/08 (2013.01); *C08J 2205/10* (2013.01); *C08J 2375/08* (2013.01)

(58) Field of Classification Search
CPC ................ C08G 18/10; C08G 18/1825; C08G 18/3819; C08G 18/482; C08G 18/4845; C08G 18/5024; C08G 18/6283; C08G 18/6685; C08G 18/7671; C08G 2101/0008; C08G 2101/0016; C08G 2101/0025; C08G 2101/005; C08G 2101/0058; C08G 2101/0066; C08J 9/125; C08J 2203/10; C08J 2205/06; C08J 2205/08; C08J 2205/10; C08J 2375/08
See application file for complete search history.

(56) References Cited

U.S. PATENT DOCUMENTS

| 3,304,273 | A | 2/1967 | Stamberger |
| 3,383,351 | A | 5/1968 | Stamberger |
| 3,523,093 | A | 8/1970 | Stamberger |
| 5,506,275 | A | 4/1996 | Valoppi |
| 6,218,468 | B1 * | 4/2001 | Mathauer ............... C08F 2/22 525/241 |
| 6,331,577 | B1 | 12/2001 | Volkert et al. |

(Continued)

FOREIGN PATENT DOCUMENTS

| CA | 2000019 A1 | 4/1990 |
| DE | 111394 C | 7/1899 |

(Continued)

OTHER PUBLICATIONS

International Search Report for PCT/EP2015/062540 dated Aug. 4, 2015. 3 pages.

(Continued)

Primary Examiner — John M Cooney
(74) Attorney, Agent, or Firm — Armstrong Teasdale LLP

(57) ABSTRACT

The present invention relates to a process for the production of polyurethanes where (a) polyisocyanate, (b) polymeric compounds having groups reactive toward isocyanates, (c) catalysts, (d) polymer P formed from ethylenically unsaturated monomers and having an average of more than 2 functional groups of the formula —O—$NH_2$ and optionally (e) blowing agent, (f) chain extender and/or crosslinking agent, and (g) auxiliaries and/or additives are mixed to give a reaction mixture, and the reaction mixture is allowed to complete a reaction to give the polyurethane. The present invention further relates to polyurethanes produced by this process and to the use of these polyurethanes in the interior of means of transport.

19 Claims, No Drawings

(56) References Cited

U.S. PATENT DOCUMENTS

| | | | |
|---|---|---|---|
| 2001/0034427 A1* | 10/2001 | Jung | C08F 220/34 526/217 |
| 2007/0173628 A1 | 7/2007 | Ruppel et al. | |
| 2007/0219282 A1 | 9/2007 | Harre et al. | |
| 2007/0259981 A1 | 11/2007 | Eling et al. | |
| 2008/0194718 A1 | 8/2008 | Schuster et al. | |
| 2008/0281013 A1 | 11/2008 | Nakamura et al. | |
| 2011/0091424 A1 | 4/2011 | Kodo et al. | |
| 2013/0079473 A1 | 3/2013 | Schnorpfeil | |
| 2013/0203880 A1* | 8/2013 | George | C08G 18/4837 521/159 |
| 2016/0304686 A1* | 10/2016 | Otero Martinez | C08G 18/2895 |

FOREIGN PATENT DOCUMENTS

| | | |
|---|---|---|
| DE | 1152536 B | 8/1963 |
| DE | 1152537 B | 8/1963 |
| EP | 90444 A2 | 10/1983 |
| EP | 364854 A2 | 4/1990 |
| EP | 897402 A1 | 2/1999 |
| EP | 0989146 A1 | 3/2000 |
| EP | 1428847 A1 | 6/2004 |
| EP | 1460094 A1 | 9/2004 |
| EP | 1529792 A1 | 5/2005 |
| EP | 1888664 A2 | 2/2008 |
| GB | 987618 A | 3/1965 |
| GB | 1040452 A | 8/1966 |
| JP | 2005-154599 A | 6/2005 |
| WO | 2005090440 A1 | 9/2005 |
| WO | 2006034800 A1 | 4/2006 |
| WO | 2006042674 A1 | 4/2006 |
| WO | 2008055952 A1 | 5/2008 |
| WO | 2009128279 A1 | 10/2009 |
| WO | 2011084865 A1 | 7/2011 |
| WO | 2015150508 A1 | 10/2015 |

OTHER PUBLICATIONS

Günther Oertel, Polyurethane Handbook, 2nd. Edition, 1993, pp. 54-95, 106-117, 177-245, 330-386 Hansen/Gardner Publications, Inc., Cincinnati, USA.

* cited by examiner

POLYURETHANES WITH REDUCED ALDEHYDE EMISSION

CROSS-REFERENCE TO RELATED APPLICATIONS

This application is a U.S. National Phase Application of PCT/EP2015/062540, filed Jun. 5, 2015, which is incorporated herein by reference in its entirety.

The present invention relates to a process for the production of polyurethanes where (a) polyisocyanate, (b) polymeric compounds having groups reactive toward isocyanates, (c) catalysts, (d) a polymer P formed from ethylenically unsaturated monomers and having an average of more than 2 functional groups of the formula —O—NH$_2$ and optionally (e) blowing agent, (f) chain extender and/or crosslinking agent, and (g) auxiliaries and/or additives are mixed to give a reaction mixture, and the reaction mixture is allowed to complete a reaction to give the polyurethane. The present invention further relates to polyurethanes produced by this process and to the use of these polyurethanes in the interior of means of transport.

Polyurethanes are versatile, being used by way of example as seat cushioning in the furniture industry and as binders for particleboard, as insulation material in the construction industry, as insulation material by way of example for pipes, hot-water tanks, and refrigerators, and as cladding components, for example in vehicle construction. In particular, polyurethanes are frequently used in automobile construction, for example in the external cladding of automobiles as spoilers, roof elements, and springing elements, and also in the interior cladding of automobiles as roof cladding, carpet-backing foam, door cladding, steering rings, control knobs, and seat cushioning.

In this context it is known that polyurethanes tend to emit organic substances which can cause unpleasant odors or, in the event of high concentration, can cause health-related problems. Enclosed spaces are in particular affected here, for example in the interiors of buildings or of vehicles such as automobiles. An example of these emissions is emission of aldehydes. Various attempts have already been made to reduce these aldehyde emissions: by way of example EP 1428847 says that aldehyde emissions can be reduced by adding polymeric substances having primary and/or secondary amino groups, but the emission of acetaldehydes in particular continues to be in need of improvement.

JP 2005-154599 describes the reduction of aldehyde emissions in polyurethane foams resulting from the addition of 0.001 to 0.01% by weight of a reducing agent selected from sodium borohydride, aluminum lithium hydride, sodium thiosulfate, sodium sulfite, hydrazine compounds, ascorbic acid, and reducing sugar. According to JP 2005-154599, however, aldehyde emission in foams still requires improvement.

US 2008/0281013 describes the use of sulfites and/or disulfites in a range from 0.02 to 2% by weight for the reduction of aldehyde emissions.

Even when reducing substances are used, the reduction in acetaldehyde emissions is in need of improvement.

It was an object of the present invention to provide a further improved process for the reduction of aldehyde emissions, especially acetaldehyde, in polyurethanes, preferably polyurethane foams. The intention here is in particular to use substances which do not impair the production of the polyurethanes.

Surprisingly, the object of the invention has been achieved via a process for the production of polyurethanes where (a) polyisocyanate, (b) polymeric compounds having groups reactive toward isocyanates, (c) catalysts, (d) polymer P formed from ethylenically unsaturated monomers and having an average of more than 2 functional groups of the formula —O—NH$_2$ and optionally (e) blowing agent, (f) chain extender and/or crosslinking agent, and (g) auxiliaries and/or additives are mixed to give a reaction mixture, and the reaction mixture is allowed to complete a reaction to give the polyurethane.

For the purposes of the invention, the term polyurethane comprises all of the known polyisocyanate polyaddition products. These comprise adducts of isocyanate and alcohol, and also comprise modified polyurethanes which can comprise isocyanurate structures, allophanate structures, urea structures, carbodiimide structures, uretonimine structures, biuret structures, and other isocyanate adducts. In particular, these polyurethanes of the invention comprise compact polyisocyanate polyaddition products, for example thermosets, and foams based on polyisocyanate polyaddition products, for example flexible foams, semirigid foams, rigid foams, and integral foams, and also polyurethane coatings and binders. For the purposes of the invention, the term polyurethanes moreover includes polymer blends comprising polyurethanes and other polymers, and also foams made of said polymer blends. It is preferable that the polyurethanes of the invention are polyurethane foams or compact polyurethanes which comprise no polymers other than the polyurethane units (a) to (g) explained hereinafter.

For the purposes of the invention, the term polyurethane foams use foams in accordance with DIN 7726. The compressive stress value for 10% compression, or compressive strength in accordance with DIN 53 421/DIN EN ISO 604 of flexible polyurethane foams of the invention here is 15 kPa or less, preferably from 1 to 14 kPa, and in particular from 4 to 14 kPa. The compressive stress value for 10% compression in accordance with DIN 53 421/DIN EN ISO 604 of semirigid polyurethane foams of the invention is from more than 15 kPa to less than 80 kPa. The open-cell factor of semirigid polyurethane foams and flexible polyurethane foams of the invention in accordance with DIN ISO 4590 is preferably greater than 85%, particularly preferably greater than 90%. Further details relating to flexible polyurethane foams and semirigid polyurethane foams of the invention can be found in "Kunststoffhandbuch [Plastics handbook], volume 7, Polyurethane [Polyurethanes]", Carl Hanser Verlag, 3$^{rd}$ edition 1993, chapter 5.

The compressive stress value for 10% compression of rigid polyurethane foams of the invention is greater than or equal to 80 kPa, preferably greater than or equal to 120 kPa, particularly preferably greater than or equal to 150 kPa. The closed-cell factor of the rigid polyurethane foam in accordance with DIN ISO 4590 is moreover more than 80%, preferably more than 90%.

Further details relating to rigid polyurethane foams of the invention can be found in "Kunststoffhandbuch [Plastics handbook], volume 7, Polyurethane [Polyurethanes]", Carl Hanser Verlag, 3$^{rd}$ edition 1993, chapter 6.

For the purposes of this invention, the term elastomeric polyurethane foams means polyurethane foams in accordance with DIN 7726 which after brief deformation by 50% of thickness in accordance with DIN 53 577 after 10 minutes exhibit no residual deformation exceeding 2% of their initial thickness. This can apply to a rigid polyurethane foam, a semirigid polyurethane foam, or a flexible polyurethane foam.

Integral polyurethane foams are polyurethane foams in accordance with DIN 7726 with a marginal zone which, as a result of the shaping process, has higher density than the core. The overall apparent density averaged over the core and the marginal zone here is preferably above 100 g/L. Again, integral polyurethane foams for the purposes of the invention can be rigid polyurethane foams, semirigid polyurethane foams, or flexible polyurethane foams. Further details relating to integral polyurethane foams of the invention can be found in "Kunststoffhandbuch [Plastics handbook], volume 7, Polyurethane [Polyurethanes]", Carl Hanser Verlag, $3^{rd}$ edition 1993, chapter 7.

Polyurethanes of the invention are obtained here in that polyisocyanates (a) are mixed with polymeric compounds (b) having groups reactive toward isocyanates, optionally catalysts (c), polymer P formed from ethylenically unsaturated monomers and having an average of more than 2 functional groups of the formula —O—$NH_2$ (d), and optionally blowing agent (e), chain extender (f), and other auxiliaries and additives (g) to give a reaction mixture, and allowing completion of a reaction.

In a preferred embodiment, the polyurethane of the invention here is a polyurethane foam with an average density of 20 to 850 g/L, preferably a semirigid polyurethane foam, or a flexible polyurethane foam, or a rigid polyurethane foam, particularly preferably an elastomeric flexible polyurethane foam, a semirigid polyurethane foam, or an elastomeric integral polyurethane foam. It is preferable that the density of the elastomeric integral polyurethane foam averaged over the core and the marginal zone is from 150 to 500 g/L. It is preferable that the average density of the flexible polyurethane foam is from 10 to 100 g/L. It is preferable that the average density of the semirigid polyurethane foam is from 70 to 150 g/L.

In another preferred embodiment, the polyurethane is a compact polyurethane with a density that is preferably more than 850 g/L, preferably from 900 to 1400 g/L, and particularly preferably from 1000 to 1300 g/L. A compact polyurethane is obtained here in essence without addition of a blowing agent. Small quantities of blowing agent, for example water, comprised in the polyols as a result of a production process are not counted as blowing agent here. It is preferable that the reaction mixture for the production of the compact polyurethane comprises less than 0.2% by weight of water, particularly less than 0.1% by weight, and in particular less than 0.05% by weight.

The polyurethane of the invention is preferably used here in the interior of means of transport, for example ships, aircraft, trucks, cars, or buses, particularly cars or buses, and in particular cars. The term automobile interior is used hereinafter for the interior of cars and buses. It is possible here to use a flexible polyurethane foam as seat cushion, a semirigid polyurethane foam as foam backing of door side elements or of instrument panels, an integral polyurethane foam as steering wheel, control knob, or headrest, and a compact polyurethane by way of example as cable-sheathing.

The polyisocyanate components (a) used for the production of the polyurethanes of the invention comprise any of the polyisocyanates known for the production of polyurethanes. These comprise the aliphatic, cycloaliphatic, and aromatic difunctional or polyfunctional isocyanates known from the prior art, and also any desired mixtures thereof. Examples are diphenylmethane 2,2'-, 2,4'-, and 4,4'-diisocyanate, the mixtures of monomeric diphenylmethane diisocyanates with diphenylmethane diisocyanate homologs having a larger number of rings (polymer MDI), isophorone diisocyanate (IPDI) and its oligomers, tolylene 2,4- and 2,6-diisocyanate (TDI), and mixtures of these, tetramethylene diisocyanate and its oligomers, hexamethylene diisocyanate (HDI) and its oligomers, naphthylene diisocyanate (NDI), and mixtures thereof.

It is preferably to use tolylene 2,4- and/or 2,6-diisocynate (TDI) or a mixture thereof, monomeric diphenylmethane diisocyanates, and/or diphenylmethane diisocyanate homologs having a larger number of rings (polymer MDI), and mixtures of these. Other possible isocyanates are mentioned by way of example in "Kunststoffhandbuch [Plastics handbook], volume 7, Polyurethane [Polyurethanes]", Carl Hanser Verlag, $3^{rd}$ edition 1993, chapter 3.2 and 3.3.2.

Polyisocyanate component (a) used can take the form of polyisocyanate prepolymers. These polyisocyanates prepolymers are obtainable by reacting the polyisocyanates described above (constituent (a-1)) in excess, for example at temperatures of from 30 to 100° C., preferably at about 80° C., with polymeric compounds (b) (constituent (a-2)), having groups reactive toward isocyanates, and/or with chain extenders (c) (constituent (a-3)) to give the isocyanate prepolymer.

Polymeric compounds (a-2) having groups reactive toward isocyanates, and chain extenders (a-3), are known to the person skilled in the art and are described by way of example in "Kunststoffhandbuch [Plastics handbook], volume 7, Polyurethane [Polyurethanes]", Carl Hanser Verlag, $3^{rd}$ edition 1993, chapter 3.1: by way of example, it is also possible to use, as polymeric compounds (a-2) having groups reactive toward isocyanates, the polymeric compounds described under (b) having groups reactive toward isocyanates.

It is possible to use, as polymeric compounds (b) having groups reactive toward isocyanates, any of the known compounds having at least two hydrogen atoms reactive toward isocyanates, for example those with functionality from 2 to 8 and with number-average molar mass from 400 to 15 000 g/mol: by way of example it is possible to use compounds selected from the group of the polyether polyols, polyester polyols, and mixtures thereof.

Polyetherols are by way of example produced from epoxides, for example propylene oxide and/or ethylene oxide, or from tetrahydrofuran with starter compounds exhibiting hydrogen-activity, for example aliphatic alcohols, phenols, amines, carboxylic acids, water, or compounds based on natural substances, for example sucrose, sorbitol or mannitol, with use of a catalyst. Mention may be made here of basic catalysts and double-metal cyanide catalysts, as described by way of example in PCT/EP2005/010124, EP 90444, or WO 05/090440.

Polyesterols are by way of example produced from aliphatic or aromatic dicarboxylic acids and polyhydric alcohols, polythioether polyols, polyesteramides, hydroxylated polyacetals, and/or hydroxylated aliphatic polycarbonates, preferably in the presence of an esterification catalyst. Other possible polyols are mentioned by way of example in "Kunststoffhandbuch [Plastics handbook], volume 7, Polyurethane [Polyurethanes]", Carl Hanser Verlag, $3^{rd}$ edition 1993, chapter 3.1.

Other materials that can be used, alongside the polyetherols and polyesterols described, are polyetherols or polyesterols which are also termed polymer polyetherols or polymer polyesterols and which comprise fillers. These compounds preferably comprise dispersed particles made of thermoplastics, for example composed of olefinic monomers such as acrylonitrile, styrene, (meth)acrylates, (meth)acrylic acid, and/or acrylamide. These polyols comprising fillers are known and are obtainable commercially. A production process for these is described by way of example in DE 111 394, U.S. Pat. Nos. 3,304,273, 3,383,351, 3,523,093, DE 1 152 536, DE 1 152 537 WO 2008/055952, and WO 2009/128279.

In a particularly preferred embodiment of the present invention, component (b) comprises polyetherols, and more preferably comprises no polyesterols. Preferably, polymers P are not regarded as polymeric compounds having at least two hydrogen atoms reactive toward isocyanates, even when they bear functional groups of the formula —O—$NH_2$.

Catalysts (c) greatly accelerate the reaction of the polyols (b) and optionally chain extender and crosslinking agent (f), and also chemical blowing agent (e) with the organic, optionally modified polyisocyanates (a). The catalysts (c) here comprise incorporable amine catalysts. These have at least one, preferably from 1 to 8, and particularly preferably from 1 to 2, groups reactive toward isocyanates, for example primary amine groups, secondary amine groups, hydroxy groups, amides, or urea groups, preferably primary amine groups, secondary amine groups, or hydroxy groups. Incorporable amine catalysts are used mostly for the production of low-emission polyurethanes which are in particular used in the automobile-interior sector. These catalysts are known and are described by way of example in EP1888664. These comprise compounds which preferably comprise, alongside the group(s) reactive toward isocyanates, one or more tertiary amino groups. It is preferable that at least one tertiary amino groups of the incorporable catalysts bears at least two aliphatic hydrocarbon moieties, preferably having from 1 to 10 carbon atoms per moiety, particularly preferably having from 1 to 6 carbon atoms per moiety. It is particularly preferable that the tertiary amino groups bear two moieties selected mutually independently from methyl and ethyl moiety, and also bear another organic moiety. Examples of incorporable catalysts that can be used are bisdimethylaminopropylurea, bis(N,N-dimethylaminoethoxyethyl) carbamate, dimethylaminopropylurea, N,N,N-trimethyl-N-hydroxyethylbis(aminopropyl ether), N,N,N-trimethyl-N-hydroxyethylbis(aminoethyl ether), diethylethanolamine, bis(N,N-dimethyl-3-aminopropyl)amine, dimethylaminopropylamine, 3-dimethyaminopropyl-N,N-dimethylpropane-1,3-diamine, dimethyl-2-(2-aminoethoxyethanol), and (1,3-bis(dimethylamino)propan-2-ol), N,N-bis(3-dimethylaminopropyl)-N-isopropanolamine, bis(dimethylaminopropyl)-2-hydroxyethylamine, N,N,N-trimethyl-N-(3 aminopropyl)bis(amino-ethyl ether), 3-dimethylaminoisopropyldiisopropanolamine, and mixtures thereof.

It is also possible to use conventional catalysts, alongside the incorporable amine catalysts, to produce the polyurethanes. Mention may be made by way of example of amidines, such as 2,3-dimethyl-3,4,5,6-tetrahydropyrimidine, tertiary amines, such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo [3.3.0]octane, and preferably 1,4-diazabicyclo[2.2.2]octane, and alkanolamine compounds, such as triethanolamine, triisopropanolamine, N-methyl- and N-ethyldiethanolamine, and dimethylethanolamine. It is also possible to use organometallic compounds, preferably organotin compounds, such as tin(II) salts of organic carboxylic acids, e.g. tin(II) acetate, tin(II) octoate, tin(II) ethylhexoate, and tin(II) laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. The organometallic compounds can be used alone or preferably in combination with strongly basic amines. If component (b) involves an ester, it is preferable to use exclusively amine catalysts. In a particularly preferred embodiment, catalysts (c) used comprise exclusively incorporable catalysts.

If catalysts (c) are used, these can by way of example be used at a concentration of from 0.001 to 5% by weight, in particular from 0.05 to 2% by weight, as catalyst or, respectively, catalyst combination, based on the weight of component (b).

Also used are (d) polymers P, which may be homopolymers or copolymers, where the polymers P have an average of more than 2 functional groups of the formula —O—$NH_2$. Polymers P are formed from ethylenically unsaturated monomers. Accordingly, they have a polymer backbone formed from carbon atoms, hereinafter also referred to as carbon backbone. The functional groups of the formula —O—$NH_2$ can be bound to the carbon backbone either directly or via a linker A. Here, A is preferably a divalent radical of the formula X—[O-Alk]$_n$, where X is a chemical bond or is a bivalent radical which is bonded to a carbon atom of the polymer backbone and is selected from phenylene, phenylene-$CH_2$—, C(O), $CH_2$, O—$C_2$-$C_{12}$-alkanediyl and C(O)—$NR^c$—($C_2$-$C_{10}$-alkanediyl) where $R^c$ is hydrogen, $C_1$-$C_4$-alkyl or —($C_2$-$C_{12}$-alkanediyl)-O—$NR^1R^2$, where $R^c$ is especially hydrogen; n is a number from 0 to 20, where n is not 0 when X is C(O), and where n is especially 0;

Alk is $C_2$-$C_4$-alkanediyl and especially $CH_2CH_2$ (=ethane-1,2-diyl).

n is preferably not 0 when X is a chemical bond.

In a first embodiment, X is a chemical bond or $CH_2$ and n is an integer from 1 to 20, in particular from 1 to 10, with n also being able to be 0 when X is $CH_2$.

In a second embodiment, X is phenylene and n is 0 or an integer from 1 to 20, in particular from 1 to 10 and in particular 0.

In a third embodiment, X is phenylene-$CH_2$— and n is 0 or an integer from 1 to 20, in particular from 1 to 10 and in particular 0.

In a fourth embodiment, X is C(O) and n is an integer from 1 to 20, in particular from 1 to 10 and in particular 1.

In a fifth embodiment, X is C(O)—$NR^c$—($C_2$-$C_{10}$-alkanediyl), where $R^c$ is as defined above and is in particular hydrogen, and n is 0 or an integer from 1 to 20, in particular from 1 to 10 and in particular 0.

In a sixth embodiment, X is $C_2$-$C_{12}$-alkanediyl or O—$C_2$-$C_{12}$-alkanediyl and n is 0 or 1.

In a specific embodiment, X is phenylene-$CH_2$— and n is 0.

The content of functional groups of the formula —O—$NH_2$ can be varied over wide ranges. In general, the polymers P have an average (number average) of more than 2, preferably at least 2.5 and in particular at least 3, groups of the formula —O—$NR^1R^2$. The upper limit to the number of functional groups of the formula —O—$NH_2$ is imposed merely by the molecular weight of the polymers P and can be, for example, up to 1000 or more. The polymers P preferably have from 0.05 to 6 mol/kg, in particular from 0.1 to 3 mol/kg, of functional groups of the formula —O—$NR^1R^2$.

The number average molecular weight $M_n$ of the polymers will generally be at least 500 g/mol, in particular at least 5000 g/mol and especially at least 10 000 g/mol. The number average molecular weight will frequently not exceed $10^6$ g/mol, in particular $5 \times 10^5$ g/mol and especially $2 \times 10^5$ g/mol. The weight average molecular weight $M_w$ of the polymers P is typically in the range from 550 to $5 \times 10^6$ g/mol, frequently in the range from 10 000 to $2 \times 10^6$ g/mol and in particular in the range from 20 000 to $10^6$ g/mol. The ratio of weight average molecular weight to number average molecular weight $M_w/M_n$ is typically in the range from 1.1 to 10 and in particular in the range from 1.2 to 5.

The molecular weight values indicated here correspond to the values as can be determined by size exclusion chromatography using defined polystyrene standards. For further details, reference is made to the information given in the examples.

The polymers P have an average of more than 2 repeat units $M_A$ derived from a monoethylenically unsaturated monomer A bearing a functional group of the formula —O—$NR^1R^2$.

The monoethylenically unsaturated monomer A preferably has the formula I:

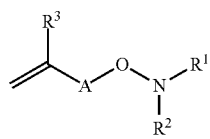

(I)

where
R is hydrogen or methyl and
A is a group of the formula X—[O-Alk]$_n$, where X, Alk and n are as defined above and in particular have the meanings indicated as preferred or in connection with the embodiments 1 to 6.

Particular preference is given to monomers A monomers of the formula I in which X is phenylene-CH$_2$— and n is 0 or an integer from 1 to 20, in particular from 1 to 10, and n is in particular 0. Alk is, if present, in particular ethane-1,2-diyl. In specific embodiments, the monomers A are selected from among the monomers of the formula I in which R is hydrogen and A is phenylene-CH$_2$.

Among the polymers P, preference is given to copolymers, i.e. polymers which have not only the repeat units $M_A$ but also one or more further repeat units $M_B$ which are derived from monoethylenically unsaturated monomers B which do not have any functional group of the formula —O—NH$_2$. Preference is likewise given to polymers which have not only the repeat units $M_A$ but also repeat units $M_{B'}$ which are derived from vinyl alcohol and optionally repeat units $M_B$. In principle, all monomers B which have an ethylenically unsaturated group are suitable as comonomers. The monomers B can be neutral, basic, acidic, nonionic, anionic or cationic.

In the preferred polymers P, the molar ratio of repeat units $M_A$ to repeat units $M_B$ is generally in the range from 1:100 to 10:1, in particular in the range from 1:80 to 2:1 and especially in the range from 1:75 to 1:1.

In the polymers P, the proportion of repeat units $M_A$, based on the total weight of the repeat units constituting the polymer P, will generally be at least 5% by weight, preferably at least 10% by weight and in particular at least 15% by weight. Accordingly, the proportion of repeat units $M_A$ in the polymers P is generally in the range from 10 to 100% by weight or from 5 to 90% by weight, in particular in the range from 10 to 100% by weight or in the range from 10 to 80% by weight, especially in the range from 15 to 100% by weight or in the range from 15 to 50% by weight, in each case based on the total amount of repeat units constituting the polymer P1. The proportion of repeat units $M_B$ or $M_{B'}$ is, if these units are present, generally in the range from 10 to 95% by weight, in particular in the range from 20 to 90% by weight or in the range from 50 to 85% by weight, in each case based on the total amount of repeat units constituting the polymer P1.

In preferred embodiments, the repeat units MB or MB' of the polymers P comprise one or more repeat units which are derived from monomers B1 which have a solubility in water of at least 50 g/l, in particular at least 100 g/l, at 20° C. and 1 bar or from vinyl alcohol.

Examples of monomers B1 are the following monomer classes B1-a to B1-j:

B1-a: monoethylenically unsaturated C$_3$-C$_8$-monocarboxylic acids such as acrylic acid, methacrylic acid, crotonic acid or vinylacetic acid and salts thereof, in particular alkali metal salts and ammonium salts thereof;

B1-b: monoethylenically unsaturated C$_4$-C$_8$-dicarboxylic acids such as fumaric acid, itaconic acid, citraconic acid or maleic acid and salts thereof, in particular alkali metal salts and ammonium salts thereof;

B1-c: monoethylenically unsaturated sulfonic acids such as vinylsulfonic acid, allylsulfonic acid, sulfoethyl acrylate, sulfoethyl methacrylate, sulfopropyl acrylate, sulfopropyl methacrylate, 2-hydroxy-3-acryloxypropylsulfonic acid, 2-hydroxy-3-methacryloxypropylsulfonic acid, styrenesulfonic acids and 2-acrylamido-2-methylpropanesulfonic acid, styrenesulfonic acid and derivatives thereof, for instance styrene-4-sulfonic acid and styrene-3-sulfonic acid, and also the salts, in particular the alkaline earth metal salts or alkali metal salts of the abovementioned acids, for instance sodium styrene-3-sulfonate and sodium styrene-4-sulfonate;

B1-d: monoethylenically unsaturated phosphonic acids and phosphoric acids such as vinylphosphonic acid, allylphosphonic acid, phosphonoethyl acrylate, phosphonoethyl methacrylate, phosphonopropyl acrylate, phosphonopropyl methacrylate and 2-acrylamido-methylpropanephosphoric acid, and the salts, in particular the alkaline earth metal salts or alkali metal salts, of the abovementioned acids;

B1-e: amides of monoethylenically unsaturated C$_3$-C$_8$-monocarboxylic acids, e.g. acrylamide or methacrylamide;

B1-f: hydroxy-C$_2$-C$_4$-alkyl esters of monoethylenically unsaturated C$_3$-C$_8$-monocarboxylic acids, in particular the hydroxy-C$_2$-C$_4$-alkyl esters of acrylic acid and of methacrylic acid, e.g. 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate or 4-hydroxybutyl methacrylate;

B1-g: poly-C$_2$-C$_4$-alkylene oxide esters of monoethylenically unsaturated C$_3$-C$_8$-monocarboxylic acids, in particular the esters of acrylic acid or of methacrylic acid, for example monomers of the formula A below

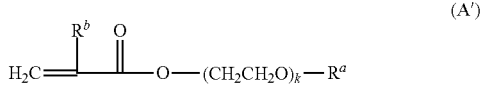

(A')

where
k is an integer from 4 to 40, $R^a$ is hydrogen or $C_1$-$C_4$-alkyl and $R^b$ is hydrogen or methyl;

B1-h: di-$C_1$-$C_4$-alkylamino-$C_2$-$C_4$-alkyl esters of monoethylenically unsaturated $C_3$-$C_8$-monocarboxylic acids, in particular the dimethylamino-$C_2$-$C_4$-alkyl esters and the di-ethylamino-$C_2$-$C_4$-alkyl esters, especially of acrylic acid or of methacrylic acid, e.g. 2-(dimethylamino)ethyl acrylate, 2-(diethylamino)ethyl methacrylate, 2-(dimethylamino)propyl acrylate, 2-(diethylamino)propyl methacrylate, 3-(dimethylamino)propyl acrylate, 3-(diethylamino)propyl methacrylate and acid addition salts thereof, in particular the hydrochlorides, hydrobromides and hydrosulfates thereof;

B1-i: N-vinyllactams such as N-vinylpyrrolidone or N-vinylcaprolactam;

B1-j: olefinically unsaturated nitriles such as acrylonitrile or methacrylonitrile.

Among the monomers B1-a to B1-h, preference is given to the monomers B1-a, B1-c, B1-d, B1-e, B1-f and B1-g and especially the monomers B1-a, B1-e and B1-f.

In addition to or instead of the abovementioned repeat units which are derived from the monomers B1 or vinyl alcohol, the repeat units $M_B$ can also comprise repeat units which are derived from monomers B2 which have only a low solubility in water which at 20° C. typically does not exceed 40 g/l and in particular 30 g/l.

These include:

B2-a: esters and diesters of monoethylenically unsaturated $C_3$-$C_8$-monocarboxylic and $C_4$-$C_8$-dicarboxylic acids with $C_1$-$C_{30}$-alkanols, in particular with $C_1$-$C_{10}$-alkanols, B2-b: esters of vinyl or allyl alcohol with $C_1$-$C_{30}$-monocarboxylic acids, B2-c: vinyl aromatics, B2-d: amides of monoethylenically unsaturated $C_3$-$C_8$-monocarboxylic acids with $C_1$-$C_{30}$-alkylamines or di-$C_1$-$C_{30}$-alkylamines, in particular with $C_1$-$C_{10}$-alkylamines or di-$C_1$-$C_{10}$-alkylamines, and mixtures thereof;

B2-e: vinyl halides and chloroprene;

B2-f: olefins and conjugated diolefins.

B2 is preferably selected from among the monomers B2-a, B2-b and B2-c, in particular from among the esters of monoethylenically unsaturated $C_3$-$C_8$-monocarboxylic acids, in particular the esters of acrylic acid (acrylates) and the esters of methacrylic acid (methacrylates), with $C_1$-$C_{10}$-alkanols and vinyl aromatics, particularly preferably from among $C_1$-$C_{10}$-alkyl acrylates and $C_1$-$C_{10}$-alkyl methacrylates and vinyl aromatics and especially from among methyl acrylate, ethyl acrylate, n-propyl acrylate, isopropyl acrylate, n-butyl acrylate, tert-butyl acrylate, 2-butyl acrylate, isobutyl acrylate, 2-ethylhexyl acrylate, methyl methacrylate, n-butyl methacrylate, tert-butyl methacrylate and styrene.

The monomers B preferably comprise at least one monomer B1 or a combination of at least one monomer B1 with at least one monomer B2. The molar proportion of the monomers B1, based on the total number of monomers B, preferably makes up at least 10 mol % and in particular at least 20 mol % and is in particular in the range from 10 to 100 mol % and especially in the range from 20 to 100 mol %, based on the total amount of monomers B. In this embodiment, the proportion of monomers B2 will accordingly not exceed 80 mol % and in particular 90 mol %, based on the total amount of monomers B.

Among the polymers P, preference is given to polymers which are soluble or at least dispersible in water. Among the polymers P, particular preference is given to polymers which are soluble in water at least at pH >10 and 20° C. and especially those which are also soluble at pH 8 and 20° C. or pH <8 and 20° C. Such polymers P generally comprise at least 10% by weight, in particular at least 20% by weight and especially at least 30% by weight, based on the total amount of monomers A and B constituting the polymer P, of at least one monomer B1 selected, in particular, from among the monomers B1-a, B1-c, B1-d, B1-e, B1-f and B1g in polymerized form.

In particular, preference is given to polymers P which comprise, in polymerized form, from 5 to 90% by weight, in particular from 10 to 80% by weight and especially from 15 to 50% by weight, of at least one monomer A, in particular a monomer of the formula I and especially a monomer of type 3; and from 10 to 95% by weight, in particular from 20 to 90% by weight and especially from 30 to 85% by weight, of at least one monomer B1 which is, in particular, selected from among the monomers B1-a, B1-c, B1-d, B1-e, B1-f and B1g;

from 0 to 85% by weight, or from 5 to 85% by weight, in particular from 0 to 70% by weight or from 5 to 70% by weight and especially from 0 to 55% by weight or from 5 to 55% by weight, of one or more monomers B2 selected, in particular, from among the monomers B2-a and B2-c;

where all figures in % by weight are based on the total amount of monomers A and B constituting the polymer P.

Preference is likewise given to polymers P which comprise, in polymerized form, from 5 to 90% by weight, in particular from 10 to 80% by weight and especially from 15 to 50% by weight, of at least one monomer A, in particular a monomer of the formula I and especially a monomer of type 1;

from 10 to 95% by weight, in particular from 20 to 90% by weight and especially from 30 to 85% by weight, of repeat units which are derived from vinyl alcohol;

from 0 to 85% by weight, or from 5 to 85% by weight, in particular from 0 to 70% by weight or from 5 to 70% by weight and especially from 0 to 55% by weight or from 5 to 55% by weight, of one or more monomers B1 selected, in particular, from among the monomers B1-a, B1-c, B1-d, B1-e, B1-f and B1g;

from 0 to 85% by weight or from 5 to 85% by weight, in particular from 0 to 70% by weight or from 5 to 70% by weight and especially from 0 to 55% by weight or from 5 to 55% by weight, of one or more monomers B2 selected, in particular, from among the monomers B2-a and B2-b;

where all figures in % by weight are based on the total amount of monomers A and B constituting the polymer P.

The polymers P are generally uncrosslinked, i.e. they comprise essentially no monomers having two or more, unconjugated double bonds in polymerized form. In particular, the proportion of monomers having two or more, unconjugated double bonds is less than 0.1% by weight, in particular less than 0.05% by weight or less than 0.01% by weight, based on the total amount of monomers A and B constituting the polymer P.

The preparation of the polymers P can be effected in analogy to known methods of polymer synthesis, such as free-radical or ionic polymerization techniques. For example, the preparation of the polymers P is described in EP 14163568.0.

Quantities of component (d) used for the purposes of the present invention are preferably from 0.01 to 2% by weight, particularly preferably from 0.02 to 1% by weight, and in particular from 0.05 to 0.2% by weight, based on the total weight of component (a) to (f). Component (d) is especially preferably used in the form of an aqueous solution, especially preferably having a concentration of 50 to 300 g/L, preferably 100 to 200 g/L. In this case, the water solvent is simultaneously blowing agent (e).

If the intention is that the polyurethane of the invention take the form of polyurethane foam, reaction mixtures of the invention also comprise blowing agent (e). It is possible here to use any of the blowing agents known for the production of polyurethanes. These can comprise chemical and/or physical blowing agents. These blowing agents are described by way of example in "Kunststoffhandbuch [Plastics handbook], volume 7, Polyurethane [Polyurethanes]", Carl Hanser Verlag, $3^{rd}$ edition 1993, chapter 3.4.5. The term chemical blowing agent here means compounds which form gaseous products through reaction with isocyanate. Examples of these blowing agents are water and carboxylic acids. The term physical blowing agents means compounds which have been dissolved or emulsified in the starting materials for the polyurethane production reaction and evaporate under the conditions of formation of polyurethane. These are by way of example hydrocarbons, halogenated hydrocarbons, and other compounds, examples being perfluorinated alkanes such as perfluorohexane, chlorofluorocarbons, and ethers, esters, ketones, acetals, and/or liquid carbon dioxide. Any desired quantity of the blowing agent can be used here. The quantity used of the blowing agent is preferably such that the density of the resultant polyurethane foam is from 10 to 850 g/L, particularly from 20 to 800 g/L, and in particular from 25 to 500 g/L. It is particularly preferable to use blowing agents comprising water.

Chain extenders and crosslinking agents (f) used here can be compounds of molar mass less than 400 g/mol which have at least two groups reactive toward isocyanates, the term chain extenders being used here for molecules having two hydrogen atoms reactive toward isocyanate, and the term crosslinking agent being used here for molecules having more than two hydrogens reactive toward isocyanate. However, it is also possible here to omit the chain extenders or crosslinking agents. Addition of chain extenders, crosslinking agents, or else optionally a mixture thereof can, however, prove to be advantageous for modification of mechanical properties, e.g. hardness.

If chain extenders and/or crosslinking agents (f) are used, use may be made of the chain extenders and/or crosslinking agents known in the production of polyurethanes. These are preferably low-molecular-weight compounds having functional groups reactive toward isocyanates, for example glycerol, trimethylolpropane, glycol, and diamines. Other possible low-molecular-weight chain extenders and/or crosslinking agents are mentioned by way of example in "Kunststoffhandbuch [Plastics handbook], volume 7, Polyurethane [Polyurethanes]", Carl Hanser Verlag, $3^{rd}$ edition 1993, chapter 3.2 and 3.3.2.

It is moreover possible to use auxiliaries and/or additives (g). It is possible here to use any of the auxiliaries and additives known for the production of polyurethanes. Mention may be made by way of example of surface-active substances, foam stabilizers, cell regulators, release agents, fillers, dyes, pigments, flame retardants, hydrolysis stabilizers, fungistatic substances, and bacteriostatic substances. These substances are known and are described by way of example in "Kunststoffhandbuch [Plastics handbook], volume 7, Polyurethane [Polyurethanes]", Carl Hanser Verlag, $3^{rd}$ edition 1993, chapter 3.4.4 and 3.4.6 to 3.4.11.

The quantities of the polyisocyanates (a), the polyols (b), polymer P formed from ethylenically unsaturated monomers and having an average of more than 2 functional groups of the formula —O—$NH_2$ (d) and, if used, the blowing agents (e) and chain extenders, and/or crosslinking agents (f) used in the production of the polyurethane of the invention are generally such that the equivalence ratio of NCO groups of the polyisocyanates (a) to the total number of the reactive hydrogen atoms of components (b), (c), (d), and optionally (e), and (f) is from 0.75 to 1.5:1, preferably from 0.80 to 1.25:1. If the cellular plastics comprise at least some isocyanurate groups, the ratio of NCO groups of the polisocyanates (a) to the total number of the reactive hydrogen atoms of component (b), (c), (d), and optionally (e) and (f) is usually from 1.5 to 20:1, preferably from 1.5 to 8:1. A ratio of 1:1 here corresponds to an isocyanate index of 100.

The quantitative and qualitative differences between the respective starting materials (a) to (g) for the production of polyurethanes of the invention in the form of thermoplastic polyurethane, flexible foam, semirigid foam, rigid foam, or integral foam are only small: by way of example, the production of compact polyurethanes uses no blowing agents, and thermoplastic polyurethane uses preferably strictly difunctional starting materials. It is moreover possible by way of example to vary the resilience and hardness of the polyurethane of the invention by way of the functionality and the chain length of the relatively high-molecular-weight compound having at least two reactive hydrogen atoms. These modifications are known to the person skilled in the art.

The starting materials for the production of a compact polyurethane are described by way of example in EP 0989146 or EP 1460094, the starting materials for the production of a flexible foam are described by way of example in PCT/EP2005/010124 and EP 1529792, the starting materials for the production of a semirigid foam are described by way of example in "Kunststoffhandbuch [Plastics handbook], volume 7, Polyurethane [Polyurethanes]", Carl Hanser Verlag, $3^{rd}$ edition 1993, chapter 5.4, the starting materials for the production of a rigid foam are described in PCT/EP2005/010955, and the starting materials for production of an integral foam are described in EP 364854, U.S. Pat. No. 5,506,275, or EP 897402. The polymer P formed from ethylenically unsaturated monomers and having an average of more than 2 functional groups of the formula —O—$NH_2$ (d) is then in each case also added to the starting materials described in said document.

The invention provides not only the process of the invention but also a polyurethane obtainable by a process of the invention. The polyurethanes of the invention are preferably used in enclosed spaces, for example as thermal insulation materials in residential buildings, for example insulation for pipes and refrigerators, in furniture construction, for example as decorative elements or as seat cushioning, and also in automobile interiors, for example as steering wheels, dashboards, door cladding, carpet-backing foam, acoustic foams, for example roof linings, and also headrests or control buttons.

The invention will be illustrated below with reference to examples.

Starting materials for the preparation of the polymer P:

4-aminoxymethylstyrene: monomer of the formula I in which R1, R2 and R are H and A is 4-phenylene-CH$_2$, prepared by the method of Wen-Jing Zhou, Mark E. Wilson, Mark J. Kurth, You-Lo Hsieh, John M. Krochta, Charles F. Shoemaker Macromolecules 1997, 30, 7063-7068.

Preparation of the polymer P:

Copolymer of sodium methacrylate and 4-aminoxymethylstyrene

A solution of 6.89 g (0.08 mol) of methacrylic acid in 50 mL of water was neutralized with 6.72 g (0.08 mol) of solid sodium hydrogen carbonate. The following were added successively to the sodium methacrylate solution thus produced: 50 mL of ethanol, 5.97 g (0.04 mol) of 4-aminoxymethylstyrene and 0.99 g (0.006 mol) of azoisobutyronitrile. The solution was then freed of oxygen by 3 vacuum/argon cycles and then stirred under argon at 75° C. for 16 hours. The slightly viscous solution was then concentrated by evaporation, ultimately at 90° C. and 1 mbar. 15.21 g of the copolymer P were obtained as a pale beige, brittle resin.

The polymer was purified by dialysis to remove traces of unconverted sodium methacrylate. The GPC analysis of the copolymer showed the following molecular weight averages: Mn=15 340 g/mol and Mw=123 500 g/mol.

The molecular weight analysis of the polymer P was effected by means of size exclusion chromatography (GPC). Prior to injection, the sample was filtered through Macherey-Nagel PTFE.20/25 (0.2 μm) and separated by means of a separating column combination (PI gel pre-column (PI gel 5 μm, ID: 7.5 mm, L: 5 cm), PLgel MIXED B (PL gel 10 μm, ID: 7.5 mm, L: 30 cm)). Detection was by means of a DRI HP 1100. Calibration was effected with narrow-distribution polystyrene standards from Polymer Laboratories with molecular weights of M=580 to M=6,870,000, and hexylbenzene (M=162). The values outside this elution range were ex-trapolated.

Feedstocks for polyurethane production

Polyol A: Polyetherol with OH number 28 mg KOH/g and functionality 2.7 based on ethylene oxide and propylene oxide, with propylene oxide content 84% by weight and ethylene oxide content 14% by weight Polyol B: Polyetherol with OH number 250 mg KOH/g and functionality 2.0 based on polyol A (35%), propylene oxide (45%), and dimethylaminopropylamine (20%)

TEOA: Triethanolamine

Isopur SU-12021: Black paste from ISL-Chemie

Jeffcat ZF10: Catalyst from Huntsman

Jeffcat DPA: Catalyst from Huntsman

Additives:

V1: 12% aqueous polyvinylamine solution

V2: sodium sulfite

V3: 2-mercaptobenzoxazole

A1: polymer P according to example

Isocyanate: Mixture of 85 parts of carbodiimide-modified 4,4'-MDI and 15 parts of polymeric diphenylmethane diisocyanate PMDI with NCO content 27.1

The mixture A was produced by mixing the following components:

92.4 parts by weight of polyol A
3.0 parts by weight of polyol B
1.5 parts by weight of TEOA
0.5 parts by weight of Isopur SA-21050
1.9 parts by weight of water
0.4 part by weight of Jeffcat DPA
0.2 part by weight of Jeffcat ZF10
Additive V1 to V3, and, respectively, A1 of table 1

The mixture A and the isocyanate component A, and also the additives of table 1, were mixed with one another with an isocyanate index of 100, and charged to a closed mold to give moldings with an average density of 160 g/L.

Formaldehyde and the acetaldehydes were determined by a procedure based on ASTM D5116-06. The size of the chamber was 4.7 liters. The polyurethane samples used were pieces measuring 110 mm×100 mm×25 mm. When molded foams were tested, parts made of the interior of the foam were used. The temperature of the test chamber during the test was 65° C., and the relative humidity was 50%. The air replacement rate was 3.0 liters per hour. The exhaust air stream with volatile aldehydes from the polyurethane was passed through a cartridge with 2,4-dinitrophenylhydrazine-coated silica during 120 minutes. The DNPH cartridge was then eluted with a mixture of acetonitrile and water. The concentration of formaldehyde and acetaldehyde of the eluate was determined by means of HPLC. The detection limit for formaldehyde emissions for this setup is ≤11 μg/m$^3$ and in the case of acetaldehyde emissions is ≤6 μg/m$^3$.

Table 1: formaldehyde values determined in the chamber for the polyurethane foams obtained without addition of additives (reference), and also with addition of the respective additives A1 or A2 as in the respective concentrations stated in parts by weight based on the total weight of the mixture A.

TABLE 1

| | Conc. in mixture A [% by wt.] | Formaldehyde (μg/m$^3$) | Acetaldehyde (μg/m$^3$) |
|---|---|---|---|
| Reference | — | 824 | 377 |
| V1 | 0.5% | 51 | 412 |
| V1 | 1.0% | 19 | 368 |
| V2 | 0.1% | 301 | 391 |
| V2 | 0.55 | 52 | 454 |
| V3 | 0.1 | 278 | 277 |
| A1 | 0.1 | 266 | 223 |
| A1 | 0.25 | 62 | 162 |

The invention claimed is:

1. A process for the production of polyurethanes, the process comprising:
    mixing
    (a) polyisocyanate,
    (b) polymeric compounds having groups reactive toward isocyanates,
    (c) catalysts, and
    (d) polymer P formed from ethylenically unsaturated monomers and having an average of more than 2 functional groups of the formula —O—NH$_2$
    to give a reaction mixture, and allowing the reaction mixture to complete a reaction to give the polyurethane.

2. The process according to claim 1, wherein the polymer P is a homo- or copolymer having an average of more than 2 repeat units $M_A$ derived from a monoethylenically unsaturated monomer A bearing a functional group of the formula —O—NH$_2$.

3. The process according to claim 1, wherein the monoethylenically unsaturated monomer A has the formula I:

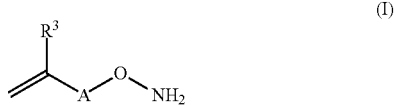

(I)

in which

R is hydrogen or methyl; and

A is a group of the formula $X-[O\text{-}Alk]_n$ in which X is a chemical bond or is a bivalent radical which is bonded to the carbon atom that bears R and is selected from phenylene, phenylene-$CH_2$—, $C(O)$, $CH_2$, $O-C_2\text{-}C_{12}$-alkanediyl and $C(O)-NR^c-(C_2\text{-}C_{10}\text{-alkanediyl})$ where $R^c$ is hydrogen, $C_1\text{-}C_4$-alkyl or $-(C_2\text{-}C_{12}\text{-alkanediyl})\text{-}O-NH_2$, n is a number from 0 to 20, where n is not 0 when X is $C(O)$, and Alk is $C_2\text{-}C_4$-alkanediyl.

4. The process according to claim 3, wherein R is hydrogen and A is phenylene-$CH_2$.

5. The process according to claim 1, wherein the polymer P is a copolymer having, aside from the repeat units of the formula $M_A$, at least one further repeat unit $M_B$ derived from monoethylenically unsaturated monomers B having no functional group of the formula $-O-NR^1R^2$.

6. The process according to claim 5, wherein the monomers B comprise monomers B1 selected from the group consisting of monoethylenically unsaturated $C_3\text{-}C_8$-monocarboxylic acids, monoethylenically unsaturated $C_3\text{-}C_8$-monocarboxylic acids, monoethylenically unsaturated sulfonic acids, amides of monoethylenically unsaturated $C_3\text{-}C_8$-monocarboxylic acids, hydroxy-$C_2\text{-}C_4$-alkyl esters of monoethylenically unsaturated $C_3\text{-}C_8$-monocarboxylic acids, poly-$C_2\text{-}C_4$-alkylene oxide esters of monoethylenically unsaturated $C_3\text{-}C_8$-monocarboxylic acids, di-$C_1\text{-}C_4$-alkylamino-$C_2\text{-}C_4$-alkyl esters of monoethylenically unsaturated $C_3\text{-}C_8$-monocarboxylic acids and N-vinyl lactams.

7. The process according to claim 5, wherein the molar ratio of repeat units $M_A$ to repeat units $M_B$ is in the range from 1:100 to 10:1.

8. The process according to claim 6, wherein the molar proportion of the monomers B1, based on the total number of monomers B, is 10 to 100 mol %.

9. The process according to claim 1, wherein the polymer P is in dissolved form in the aqueous composition.

10. The process as claimed in claim 1 wherein the mixing step comprises further mixing
  (e) a blowing agent,
  (f) at least one of a chain extender and a crosslinking agent, and
  (g) at least one auxiliary or additive
to give the reaction mixture.

11. The process as claimed in claim 1, wherein the polymeric compounds (b) having groups reactive toward isocyanates comprise polyetherols.

12. The process as claimed claim 1, wherein the catalysts (c) comprise incorporable amine catalysts.

13. The process as claimed in claim 12, wherein compounds used as incorporable catalysts have, alongside the group(s) reactive toward isocyanates, at least one tertiary aliphatic amino group.

14. The process as claimed in claim 1, wherein the polyurethane is a polyurethane foam with an average density of from 20 to 850 g/L.

15. The process as claimed in claim 1, wherein the polyurethane is a compact polyurethane with an average density of more than 850 g/L.

16. A polyurethane produced by a process as claimed in claim 1.

17. A method of using the polyurethanes as claimed in claim 16, the method comprising molding said polyurethanes in the preparation of interiors in means of transport.

18. The process as claimed in claim 10, wherein the quantity comprised of component (d), based on the total weight of components (a) to (f), is from 0.01 to 2% by weight.

19. The method of claim 17 wherein the polyurethane as claimed in claim 16 is molded to form at least one of carpet-backing foam, acoustic foam, door cladding, roof lining, a steering wheel, a control knob, a seat cushion, door side backing, an instrument panel, a headrest, and cable sheathing used in the interior of the means of transport.

* * * * *